(12) United States Patent
Meadowcroft

(10) Patent No.: US 6,371,661 B1
(45) Date of Patent: Apr. 16, 2002

(54) OPTICAL CONNECTION

(75) Inventor: Simon George Preston Meadowcroft, Stowmarket (GB)

(73) Assignee: Agilent Technologies, Inc., Loveland, CO (US)

( * ) Notice: Subject to any disclaimer, the term of this patent is extended or adjusted under 35 U.S.C. 154(b) by 0 days.

(21) Appl. No.: 09/209,208

(22) Filed: Dec. 10, 1998

(30) Foreign Application Priority Data

Mar. 17, 1998 (EP) .............................................. 98301965

(51) Int. Cl.$^7$ ................................................. G02B 6/36
(52) U.S. Cl. .............................. 385/78; 385/81; 385/85; 385/55; 385/89
(58) Field of Search ............................... 383/55, 56, 59, 383/60, 65, 78, 81, 83, 85; 385/88, 89

(56) References Cited

U.S. PATENT DOCUMENTS

| | | | | |
|---|---|---|---|---|
| 5,566,262 A | * | 10/1996 | Yamane et al. | 385/33 |
| 5,602,951 A | * | 2/1997 | Shiota et al. | 385/81 |
| 5,815,621 A | * | 9/1998 | Sakai et al. | 385/80 |
| 6,045,271 A | * | 4/2000 | Shimoji et al. | 385/85 |
| 6,086,704 A | * | 7/2000 | Kanai et al. | 385/60 |
| 6,179,482 B1 | * | 1/2001 | Takizawa et al. | 385/81 |
| 6,196,732 B1 | * | 3/2001 | Tamekuni et al. | 385/78 |

FOREIGN PATENT DOCUMENTS

| | | |
|---|---|---|
| EP | 6226651 A1 | 11/1994 |
| EP | 742456 A1 | 11/1996 |
| JP | 01191107 | 8/1989 |

* cited by examiner

Primary Examiner—Hemang Sanghavi

(57) ABSTRACT

An optical connector is provided which comprises a housing part having a fiber bore therethrough and having a housing connecting face for abutment or adjacence with a housing connecting face of a mating optical connector. An optical fiber is located in the fiber bore and fixed to the housing part, the optical fiber having a fiber connecting face. The optical fiber protrudes from the housing part at the housing connecting face, such that the fiber connecting face is displaced by a protrusion distance from the housing connecting face, the protrusion distance being between 5 um and 100 um. This approach is particularly useful for MT connectors, especially for connectorised devices comprising an optical connector as indicated above and an optical device, wherein the optical device is adapted to send or receive light through the optical fiber of the optical connector.

3 Claims, 1 Drawing Sheet

OPTICAL CONNECTION

Figure 1:
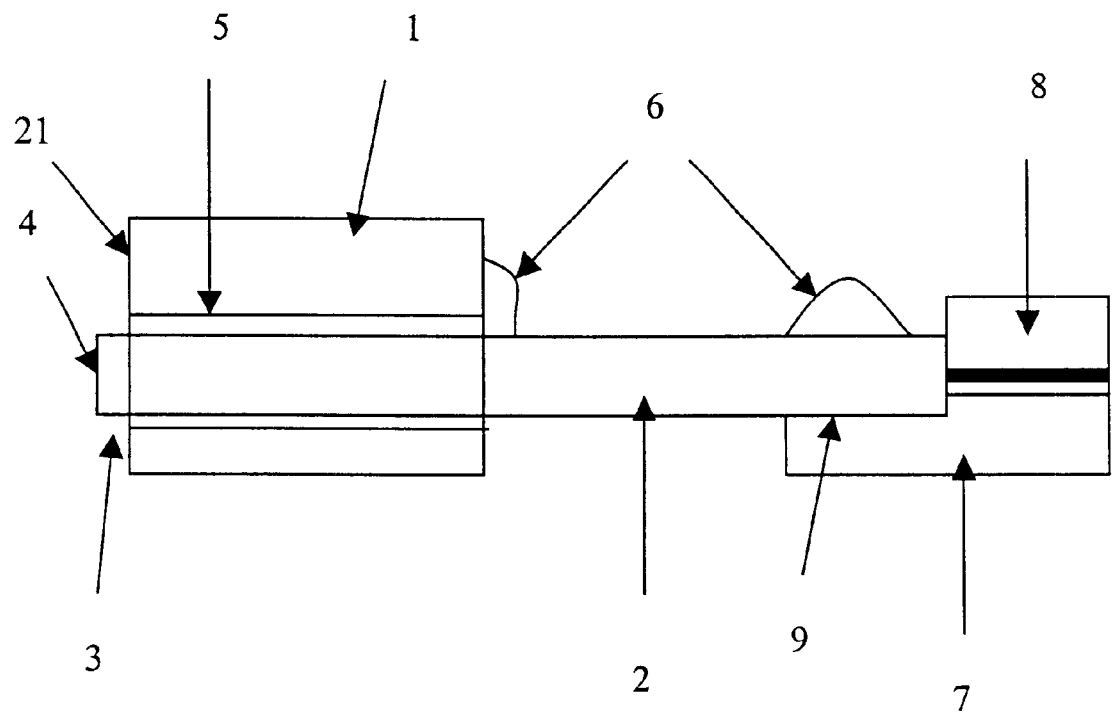

The invention relates to an optical device and means for connecting such an optical device to other devices. In particular, the invention relates to achieving good optical connection by effective abutment of optical faces of optical fibres. Many forms of optical connector involve connection of optical fibres such that opposing faces of the optical fibres are urged together into contact. It is known that effective coupling through abutment of faces may involve a measure of buckling of one or both fibres. This is discussed in, for example, U.S. Pat. No. 4,727,742. In this connector two optical fibres are butt spliced in a passage in the connector until a measure of buckling of fibres occurs. At this point the fibres are crimped into position.

An alternative solution is adopted in U.S. Pat. No. 4,907,335. In this patent a connector is described in which one or more of the optical fibres is mounted within the connector so that it is bent, all before the faces of the fibres are brought into contact. This is done to prevent excessive pressure from damaging the optical faces.

These solutions are relatively complex to manufacture, particularly for a low cost connector. For low cost connectors, it is desirable to achieve a coupling solution which is reliable yet which involves a simple assembly step. An example of a system in which a very low cost connection solution is desirable is a non-hermetic optical device, such as a laser transmitter, photodetector receiver, or tranceiver, connectorised with a standard connector such as an MT connector. In an appropriate form of such a device the active optical device is connected to an MT connector body by a short length of fiber. Typically, there will be more than one device, each connected to the MT connector by its own length of fiber (e.g. a tranceiver comprising both a laser transmitter and a photodetector receiver). This fiber within the MT connector of the connectorised device contacts the optical fiber in a further MT connector attached to, for example, a cable to convey optical signals to or from the device. Such a system is appropriate for very low cost applications, and therefore it is particularly desirable in such a system to achieve a cheap yet effective solution to guarantee effective coupling between fibres in MT connectors.

In a first aspect, the invention provides an optical connector, comprising: a housing part having a fiber bore therethrough and having a housing connecting face for abutment or adjacence with a housing connecting face of a mating optical connector; and an optical fiber located in the fiber bore and fixed to the housing part, the optical fiber having a fiber connecting face;wherein the optical fiber protrudes from the housing part at the housing connecting face, such that the fiber connecting face is displaced by a protrusion distance from the housing connecting face, the protrusion distance being between 5 $\mu$m and 100 $\mu$m. Advantageously, the housing part is an MT connector housing part. In a related aspect of the invention, there is provided a connectorised optical device comprising an optical connector as indicated above and an optical device, wherein the optical device is adapted to send or receive light through the optical fiber of the optical connector.

In a further aspect, the invention provides a connecting means between two optical components, the first optical component comprising a first optical fiber and a first housing part, and the second optical component comprising a second optical fiber and a second housing part, wherein there exists a position of mating contact between the first housing part and the second housing part, and in this position of mating contact a housing connecting face of the first housing part is adapted to be in abutment with a housing connecting face of the second housing part, and there exists a position of fiber contact in which a fiber connecting face of the first optical fiber and a fiber connecting face of the second optical fiber are just in contact with no force urging one fiber connecting face towards the other fiber connecting face; such that there exists a protrusion distance, which is the distance which the first housing part must travel relative to the second housing part to reach the position of mating contact from the position of fiber contact; wherein the protrusion distance lies between 5 $\mu$m and 100 $\mu$m.

Conventionally, the fiber in an MT or a similar connector protrudes for approximately 1 to 2 $\mu$m. This is a relatively short distance, and it is hard to control this distance precisely in manufacture. In practice, it can be found that the fiber in an MT connector is even slightly recessed with respect to the body of the connector. With no other component present to control the contact between fiber faces, it is found that the optical contact achieved by such connections alone does not reliably achieve a high-quality connection. It is found in the present invention that use of a significantly greater protrusion, in the range of 5 to 100 $\mu$m, but advantageously 10 to 20 $\mu$m, allows satisfactory contact quality to be achieved between the two connector faces without forces arising which are sufficiently great to damage the fibres or otherwise affect the optical connection. The resilience of the fiber itself is used to bring the two faces into positive contact.

The effectiveness of this solution is surprising in the light of the prior art, especially U.S. Pat. No. 4,907,335, which teaches against allowing optical fibres to buckle on coming into contact.

Figure 2:
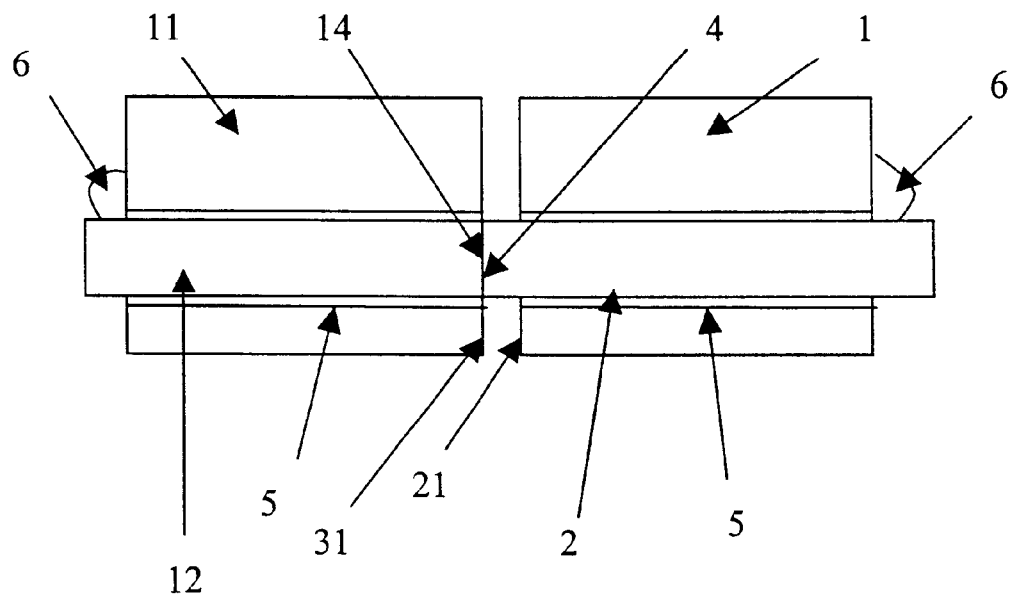

FIG. 1 shows a cross-sectional view of a connectorised optical device according to the invention; and FIG. 2 shows a cross-sectional view of a mating connection between the connectorised optical device of FIG. 1 (shown in part) and a further MT connector.

FIG. 1 shows an optical device with an MT connector. The optical device, in this case semiconductor laser 8, is mounted or formed on semiconductor substrate 7. The output of semiconductor laser 8 passes into optical fiber 2, which is located in a V-groove 9 formed in the semiconductor substrate 7. Optical fiber 2 is fixed in V-groove 9 by an appropriate layer or body of glue 6. Depending upon the nature and function of the device, optical fiber 2 can be any kind of optical fiber useful for optical communications, and may be single mode or multinode as appropriate.

The invention is equally applicable to other optical devices, such as photodetectors, and to other device mounting arrangements which have the common feature of sending or receiving light through a length of optical fiber such as optical fiber 2. For example, a solution without a V-groove could be provided, or the optical device and the optical fiber may share no common semiconductor substrate.

The laser and substrate assembly is mounted within a housing, which is not shown in FIG. 1. The precise form of the housing may be conventional and is of no especial relevance to the present invention. The present invention is particularly useful in the context of low cost, non-hermetic device housings.

Optical fiber 2 extends into MT connector body 1. MT connectors are one form of industry standard low cost fiber optic connector. An MT connector body, typically formed of an epoxy plastics material, contains a plurality of passageways 5 adapted to retain optical fibres: FIG. 1 shows one such passageway 5 retaining optical fiber 2. MT connector bodies thus contain a plurality of optical fibres, which are cleaved or otherwise severed and/or polished to form a series of optical fiber faces (such as face 4 shown in FIG. 1) at a connecting end of the connector body. A further MT connector body is similarly prepared, and the two connector bodies are fixed together with two pins (not shown here, but located on one of the connector bodies to either side of the optical fibres), the optical faces of fibres in the first MT connector body coming into contact with optical faces of the second MT fiber body during this process: these optical faces can thus be termed fiber connecting faces.

Optical fiber 2 is retained in MT connector body 1 by a further body or layer of glue 6. The optical fiber 2 needs to be cleaved or otherwise severed and/or polished to form an optical face 4 for connection with an optical face of another fiber in another MT connector. In accordance with the invention, optical fiber 2 is severed and/or polished to leave a protrusion 3 of optical face 4 from the housing connecting face 21. This protrusion 3 is significantly longer than the 1–2 $\mu$m length which optical fibres typically stand proud of connecting connector body faces. The length of this protrusion is sufficiently great, and lies within a sufficiently large tolerance range, that a satisfactory end face 4 and protrusion 3 can be achieved through a conventional fiber cleave alone without the need for polishing back end face 4. This provides a significant cost saving, by eliminating a non-trivial process step. Alternatively, a polishing step can be employed, wherein only the fiber itself is polished (as there is no need to polish in the vicinity of the connector body because of the length of protrusion).

The protrusion can lie within the range of 5–100 $\mu$m and achieve satisfactory results. However, the range of 10–20 $\mu$m is particularly effective, and hence particularly preferred.

The effect of this protrusion 3 in connection is shown in FIG. 2. Optical fiber 2 in MT connector body 1 is brought into contact with optical fiber 12 in MT connector body 11. MT connector body 11 and optical fiber 12 may, for example, be a part of a network cable for attachment to the unit containing semiconductor laser 8. As the MT connector bodies 1, 11 are brought into mating contact in conventional manner, the faces 4, 14 of optical fibres 2, 12 are brought into contact. In this case, face 14 of optical fiber 12 protrudes only by a conventional 1–2 $\mu$m from MT connector body 11. Faces 4, 14 are thus brought into positive contact. However, the length of the protrusion 3 is not so great that the optical fibres 2, 12 or the optical connection between them is damaged by excessive buckling forces. It should be noted that the preferred dimensions here are chosen in the context of a conventional optical fiber (approximately 125 $\mu$m in diameter): for a fiber of unconventional dimensions, an appropriate length of protrusion can be chosen in straightforward manner by the man skilled in the art using the same functional criteria as indicated here.

As indicated, in this arrangement there is no requirement for optical face 14 to protrude from the connector body 11. Face 14 may thus be prepared in entirely conventional manner (typically, this would then have a 1–2 $\mu$m protrusion from housing connecting face 31). Nonetheless, excellent optical contact is provided. With such an arrangement, effectively the only positive contact between the two connectors orthogonal to the plane of optical faces 4, 14 is through the optical faces themselves, and not through the housing connecting faces 21, 31 of housing parts 1, 11 or through the guide pins of the MT connectors (not shown). The guide pins do however serve, as is normal in MT connectors, to align the fibres relative to each other and to prevent lateral movement. This solution allows for good optical contact to be maintained between the optical faces 4, 14 even when some relative flexure between the housing parts 1, 11 occurs. The invention is also quite applicable to connectors between two lengths of fiber cable, rather than solely to connectorised devices. It is also possible that a protrusion of shorter length could be formed for each contacting fiber, rather than the fiber or fibres on one connector alone: in this case, the protrusion on each individual fiber could be shorter, but the cumulative protrusion of two contacting optical fiber faces from their respective connector parts would be within the range of 5–100 $\mu$m (or the preferred range of 10–30 $\mu$m). The invention is also applicable to connectors other than MT connectors: it is appropriate for any mating connector in which optical fiber faces abut, and in which an additional length of fiber equivalent to the protrusion length of the MT connector case is provided, wherein the presence of this extra length of fiber causes the two fiber faces to be held together with a satisfactory positive contact.

What is claimed is:

1. An optical connector, comprising:
   a housing part having a fiber bore therethrough and having a housing connecting face for abutment or adjacence with a housing connecting face of a mating optical connector; and
   an optical fiber located in the fiber bore and fixed to the housing part, the optical fiber having a fiber connecting face;
   wherein the optical fiber protrudes from the housing part at the housing connecting face, such that the fiber connecting face is displaced by a protrusion distance from the housing connecting face, the protrusion distance being a function of the fiber diameter.

2. An optical connector as claimed in claim 1, wherein the protrusion distance is in a range of about 4% of the fiber diameter to about 80% of the fiber diameter.

3. An optical connector as claimed in claim 1, wherein the protrusion distance is in a range of about 8% of the fiber diameter to about 16% of the fiber diameter.

* * * * *